United States Patent
Krueger et al.

(10) Patent No.: US 9,711,160 B2
(45) Date of Patent: Jul. 18, 2017

(54) SMART DOCK FOR ACTIVATING A VOICE RECOGNITION MODE OF A PORTABLE ELECTRONIC DEVICE

(75) Inventors: Scott Krueger, San Francisco, CA (US); Jesse Dorogusker, Palo Alto, CA (US); Erik Wang, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 696 days.

(21) Appl. No.: 13/482,726

(22) Filed: May 29, 2012

(65) Prior Publication Data

US 2013/0325479 A1 Dec. 5, 2013

(51) Int. Cl.
*G10L 21/00* (2013.01)
*G06F 1/16* (2006.01)
*G10L 15/22* (2006.01)

(52) U.S. Cl.
CPC ............ *G10L 21/00* (2013.01); *G06F 1/1632* (2013.01); *G10L 15/22* (2013.01)

(58) Field of Classification Search
CPC ............ H04M 2250/74; H04M 1/271; H04M 1/6075; B60R 11/0241; B60R 2011/0071; B60R 2011/0075; B60R 2011/0078; H04B 1/3877; G10L 2015/088; G10L 15/065; G10L 15/22; G10L 15/26; G10L 15/265; G10L 15/30; G10L 2015/0638; G10L 21/00; G10L 2015/223; G10L 17/22; G10L 15/063; G10L 25/78; G10L 15/28; G10L 15/02; G10L 2015/225; G10L 21/0208; G10L 25/48; G06F 1/1632; G06F 3/167; G06F 1/3203; G06F 3/038; G06F 1/16

USPC .......... 704/231, 251, 275, 270, 258
See application file for complete search history.

(56) References Cited

U.S. PATENT DOCUMENTS

| | | | |
|---|---|---|---|
| 6,229,880 B1 * | 5/2001 | Reformato | H04M 1/64 379/207.02 |
| 7,873,771 B2 | 1/2011 | Krueger | |
| 8,879,420 B2 * | 11/2014 | Eichen et al. | 370/254 |
| 2002/0025832 A1 * | 2/2002 | Durian et al. | 455/556 |
| 2002/0032042 A1 * | 3/2002 | Poplawsky et al. | 455/564 |
| 2002/0046023 A1 * | 4/2002 | Fujii | G10L 15/30 704/231 |
| 2002/0077830 A1 * | 6/2002 | Suomela et al. | 704/275 |
| 2002/0137505 A1 * | 9/2002 | Eiche et al. | 455/425 |
| 2003/0008680 A1 * | 1/2003 | Huh et al. | 455/557 |
| 2003/0028382 A1 * | 2/2003 | Chambers et al. | 704/275 |
| 2003/0050777 A1 * | 3/2003 | Walker, Jr. | G10L 15/30 704/235 |
| 2004/0133668 A1 | 7/2004 | Nicholas, III | |
| 2005/0124380 A1 * | 6/2005 | Rokusek et al. | 455/556.1 |
| 2009/0063744 A1 | 3/2009 | Krueger | |
| 2009/0064055 A1 * | 3/2009 | Chaudhri | G06F 3/04817 715/863 |

(Continued)

*Primary Examiner* — Abdelali Serrou
(74) *Attorney, Agent, or Firm* — Kilpatrick Townsend and Stockton, LLP

(57) ABSTRACT

A dock for a portable electronic device including a housing, a connector extending from the housing to connect the portable electronic device to the dock, a microphone integrated within the housing, and a processor. The processor is operatively coupled to receive audio input from the microphone, and in response to the audio input, transmit a message to the portable electronic device via the connector to activate a voice recognition mode of the portable electronic device.

20 Claims, 4 Drawing Sheets

(56) References Cited

U.S. PATENT DOCUMENTS

| | | | |
|---|---|---|---|
| 2009/0096573 A1* | 4/2009 | Graessley | H04W 12/04 340/5.8 |
| 2009/0209293 A1* | 8/2009 | Louch | H04M 1/6041 455/566 |
| 2010/0120450 A1* | 5/2010 | Herz | H04M 3/42348 455/456.3 |
| 2011/0098087 A1 | 4/2011 | Tseng | |
| 2011/0131358 A1* | 6/2011 | Ganesh | G01C 21/265 710/304 |
| 2011/0191598 A1 | 8/2011 | Sim | |
| 2012/0046074 A1* | 2/2012 | Gittleman | H04M 1/04 455/557 |
| 2012/0155445 A1* | 6/2012 | Javaregowda | H04L 65/1069 370/338 |
| 2012/0157068 A1* | 6/2012 | Eichen | H04W 4/16 455/417 |
| 2012/0191449 A1* | 7/2012 | Lloyd et al. | 704/231 |
| 2012/0295708 A1* | 11/2012 | Hernandez-Abrego | G06F 3/013 463/36 |
| 2013/0166400 A1* | 6/2013 | Nguyen | G07G 1/0018 705/16 |

* cited by examiner

SMART DOCK FOR ACTIVATING A VOICE RECOGNITION MODE OF A PORTABLE ELECTRONIC DEVICE

BACKGROUND OF THE INVENTION

The present disclosure relates generally to portable electronic devices, and more particularly to a smart dock for communicating with a portable electronic device to activate a voice recognition mode.

Portable electronic devices, such as cellular phones, have become ubiquitous in today's society, as have the peripheral electronic devices that support their use, such as docking stations and the like. Some portable electronic devices, such as the iPhone™ (made by Apple Inc., assignee of the present application), can provide users with a variety of services in addition to facilitating telephone calls. Such services can include messaging (voice, SMS, e-mail, instant messaging, application messaging, etc.), management and playback of media content (music, videos, audiobooks, photos, documents, etc.), storage of personal data (calendar, contacts, notes, etc.), Internet access, and the ability to execute various applications.

In order to utilize the various functionalities provided by a portable electronic device, a user typically must interact with their device using finger controls and/or a graphical user interface (GUI) included on their device. However, such interaction requires that the portable electronic device be in close proximity to the user (e.g., in the user's hand). If the user is not proximate to their portable electronic device (e.g., if their device is connected to a charging power source on the other side of the room), the user may be unable to utilize the various services provided by their device in a timely and convenient manner.

Some existing portable electronic devices include voice recognition capabilities that allow a user to access the various functionalities on their device using audible voice commands. However, the utilization of such voice recognition capabilities in existing devices typically involves an initial activation step requiring the user to interact with the finger controls and/or GUI of their device before voice commands can be processed.

BRIEF SUMMARY OF THE INVENTION

Embodiments of the present invention provide improved apparatus, systems and methods for communicating with a portable electronic device to activate a voice recognition mode.

In one particular embodiment, a dock for a portable electronic device comprises a housing, a connector extending from the housing to connect the portable electronic device to the dock, a microphone integrated within the housing, and a processor. The processor is operatively coupled to receive audio input from the microphone and is configured to, in response to the audio input, transmit a message to the portable electronic device via the connector to activate a voice recognition mode of the portable electronic device.

In another embodiment, the processor of the dock is operatively coupled to receive voice input from the microphone, transmit the voice input to the portable electronic device in the voice recognition mode via the connector, receive audio output from the portable electronic device in the voice recognition mode via the connector, and transmit the audio output to the speaker.

In another embodiment, a portable electronic device comprises a housing, a receptacle connector to connect the portable electronic device to a dock, and a processor. The processor is operatively coupled to receive a message from the dock via the receptacle connector and is configured to, in response to the message, activate a voice recognition mode of the portable electronic device.

In another embodiment, the portable electronic device further comprises a microphone and a speaker integrated within the housing. When the voice recognition mode of the portable electronic device is activated, the processor of the portable electronic device is further configured to receive and process voice input from the microphone, the voice input including a user request. The processor generates audio output including a response to user request, and transmits the audio output to the speaker.

In yet another embodiment, when the voice recognition mode of the portable electronic device is activated, the processor of the portable electronic device is further configured to receive voice input from the dock via the receptacle connector, the voice input including a use request. The processor retrieves the requested information and generates audio output including a response to the user request. The audio output is transmitted by the processor to the dock via the receptacle connector.

To better understand the nature and advantages of the present invention, reference should be made to the following description and the accompanying figures. It is to be understood, however, that each of the figures is provided for the purpose of illustration only and is not intended as a definition of the limits of the scope of the present invention.

DETAILED DESCRIPTION OF THE INVENTION

Embodiments of the present invention pertain to a smart dock for activating a voice recognition mode of a portable electronic device. In embodiments of the present invention, a smart dock can receive audio input from a user (e.g., a spoken word or phrase, hand clap, etc.) and transmit, in response to the audio input, a message to a portable electronic device to activate a voice recognition mode of the portable electronic device.

As used herein, a "portable electronic device" can include any electronic device that can operate in a voice recognition mode. Such devices may include, for example, a laptop computer, a tablet device, a key fob, a car key, an access card, a multi-function device, a mobile phone, a portable gaming device, a portable multimedia player, a portable music player, a personal digital assistant (PDA), a household device, and/or any portable or non-portable electronic or electro-mechanical device and/or the like. For example, a portable electronic device can include an iPod®, iPhone®, iPad®, MacBook® or iMac® device available from Apple Inc. of Cupertino, Calif.

Figure 1:
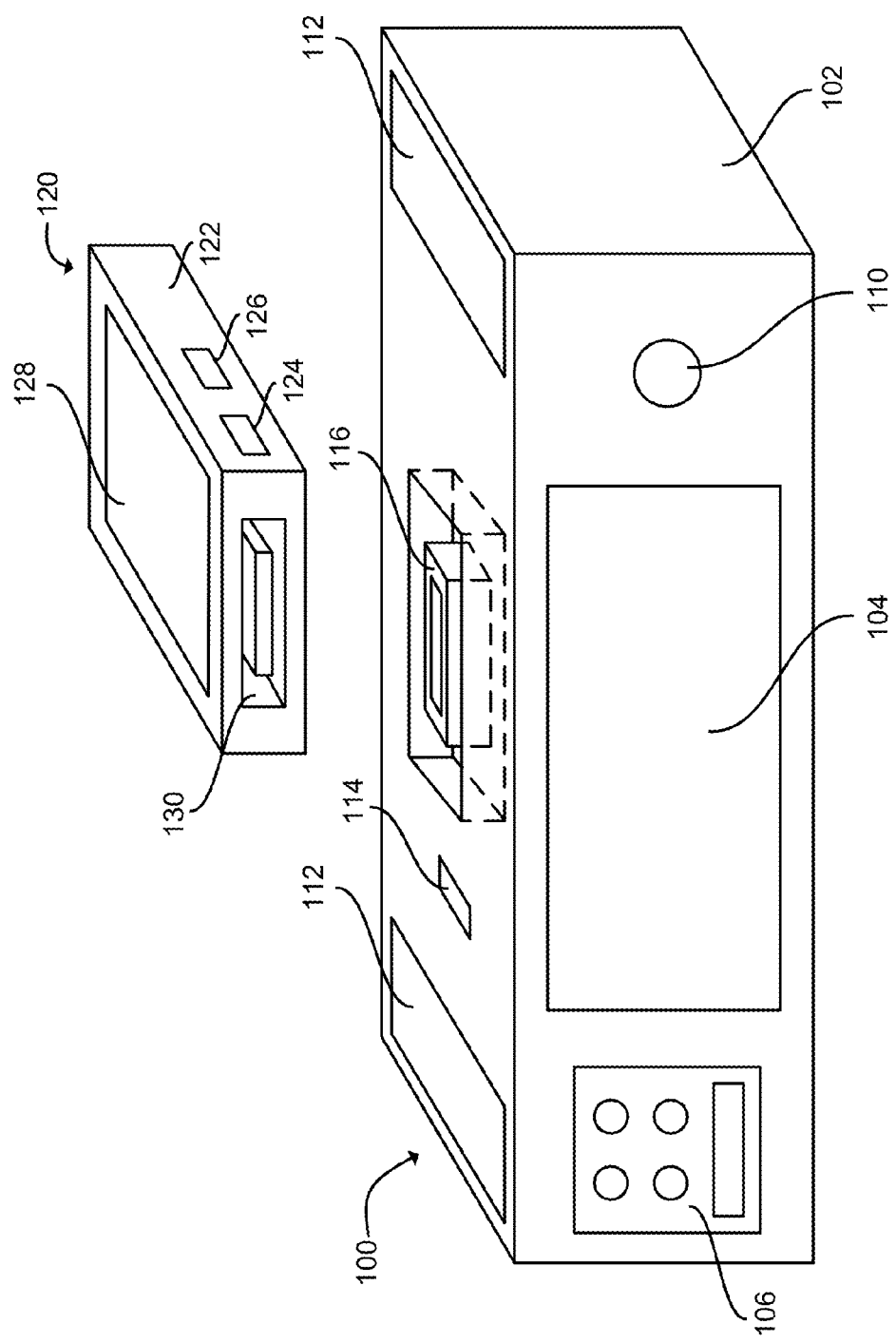
FIG. 1 illustrates a simplified perspective view of a dock 100 according to an embodiment of the present invention that activates a voice recognition mode of a portable electronic device 120.

FIG. 1 illustrates a simplified perspective view of a dock 100 according to an embodiment of the present invention that activates a voice recognition mode of a portable electronic device 120. Dock 100 can include a housing 102 and one or more user interface components integrated within housing 102. For example, dock 100 can include a microphone 114 configured to receive voice and audio input from a user, and one or more speakers 112 for presenting audio output to a user. Dock 100 can include one or more control buttons 106 for a user to control various functionalities of dock 100 (e.g., volume, tuning, audio source, equalization, etc.) and a display screen 104 which can display the current time and provide visual feedback regarding the operation of dock 100. Display screen 104 can also include a touch interface for a user to provide touch input to control various functionalities of dock 100. In embodiments of the present invention, dock 100 can include a remote sensor 110 for communicating with a remote control (not shown). For example, a remote control can communicate with remote sensor 110 using infrared (IR), radio frequency (RF), or any other suitable mode of wireless communication, to communicate user input to dock 100.

Portable electronic device 120 can include a housing 122 and one or more user interface components integrated within housing 122. For example, portable electronic device 120 can include a microphone 124 for receiving voice input from a user, and one or more speakers 126 for presenting audio output to a user. Portable electronic device 120 can also include other user interface components 128 such as a display screen which can provide visual feedback regarding the operation of portable electronic device 120 and/or act as a touch interface for a user to provide touch input, and one or more control buttons for a user to control the various functionalities of portable electronic device 120.

Portable electronic device 120 and dock 100 can include receptacle connector 130 and connector 116, respectively, for exchanging electrical signals. Connector 116 of dock 100 and receptacle connector 130 of portable electronic device 120 can include a plurality of contacts or pins (not shown) that can carry electrical signals for data, audio, video, control, and/or power. Connector 116 and receptacle connector 130 can be designed to mate with each other to physically and electrically couple the contacts of connector 116 with the contacts of receptacle connector 130 so that signals can be transmitted between the connectors. Alternatively, in embodiments of the invention, signals can be transmitted between dock 100 and portable electronic device 120 wirelessly. For example, dock 100 and portable electronic device 120 can communicate using Bluetooth, IEEE 802.11 (e.g., WiFi), or any other suitable wireless protocol.

Dock 100 and portable electronic device 120 can also include hardware configured to charge a battery (not shown) included in portable electronic device 120. For example, dock 100 can be coupled to a power source and can deliver power to portable electronic device 120 using any suitable means of power delivery such as conductive charging (e.g., direct coupling utilizing the contacts of connector 116 and receptacle connector 130) and/or wireless energy transfer (e.g., inductive coupling, magnetic resonance, etc.).

Figure 2:
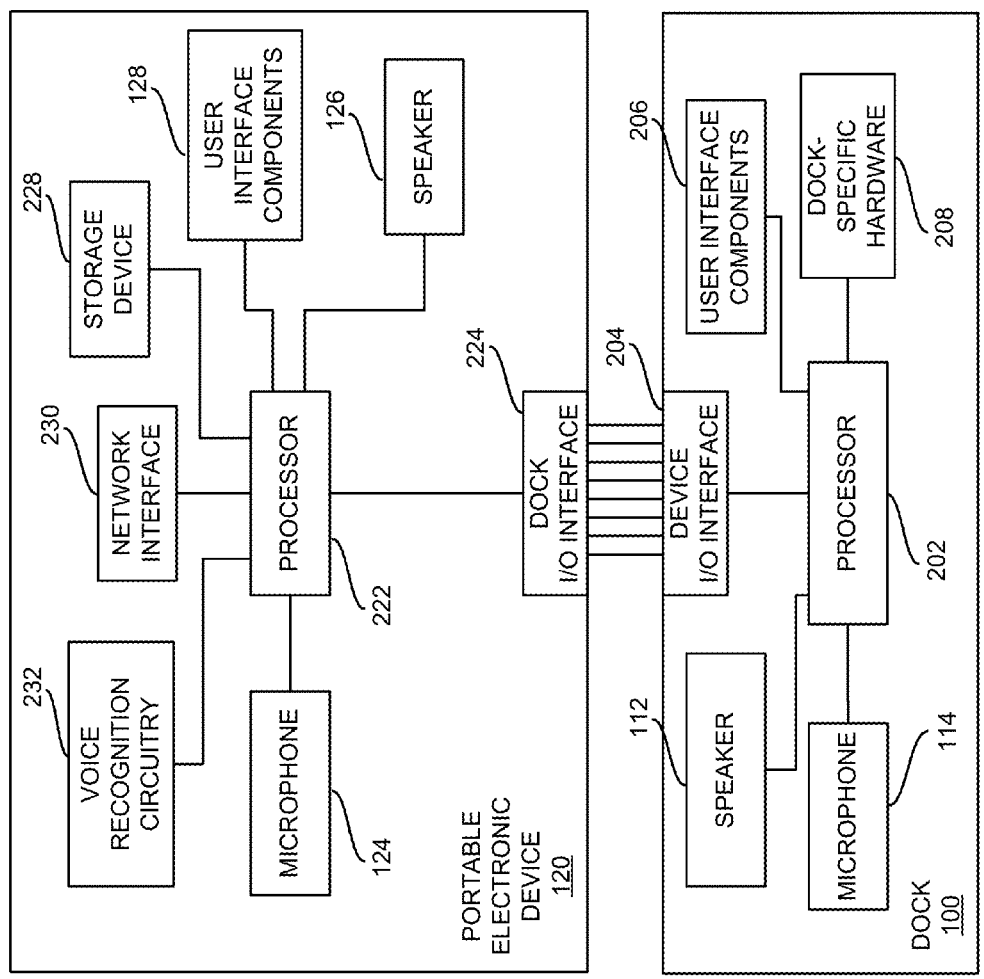
FIG. 2 illustrates a simplified block diagram showing various components of a system according to an embodiment of the present invention, the system including dock 100 and portable electronic device 120 shown in FIG. 1.

FIG. 2 illustrates a simplified block diagram showing various components of a system according to an embodiment of the present invention, the system including dock 100 and portable electronic device 120 shown in FIG. 1. Dock 100 can include microphone 114 and speaker 112 of FIG. 1, in addition to other user interface components 206, a processor 202, a device I/O interface 204, and other dock-specific hardware 208.

Microphone 114 can include one or more acoustic-to-electric transducers or sensors configured to convert sounds into an electrical signal. For example, microphone 114 can include one or more of a condenser microphone, an electret condenser microphone, a dynamic microphone, a ribbon microphone, a carbon microphone, a piezoelectric microphone, a fiber optic microphone, a laser microphone, a liquid microphone, a MEMS microphone, and/or the like. In embodiments of the present invention, microphone 114 can transmit audio or voice input received from a user to processor 202 in the form of an electrical signal.

Speaker 112 can include one or more electroacoustic transducers configured to produce sound in response to an electrical audio signal. For example, speaker 112 can include one or more of a full-range driver, a subwoofer, a woofer, a mid-range driver, a tweeter, a coaxial driver, and/or the like. In embodiments of the present invention, processor 202 can transmit audio output to speaker 112 for presentment to a user.

Other user interface components 206 can include any other user-operable input devices such as control buttons 106 of FIG. 1, a touch pad, touch screen, scroll wheel, click wheel, dial, button, switch, keypad, or the like, as well as output devices such as display screen 104 of FIG. 1, indicator lights, headphone jacks, or the like, together with supporting electronics (e.g., digital-to-analog or analog-to-digital converters, signal processors, and/or the like). Depending on the implementation of a particular dock 100, a user can operate user interface components 206 to invoke the various functionalities of dock 100.

Processor 202 can include, for example, one or more integrated circuits such as single-core or multi-core microprocessors and/or microcontrollers executing program code to perform various functions associated with dock 100. For example, processor 202 can receive audio input from microphone 114, and in response to the input, transmit a message to portable electronic device 120 to activate a voice recognition mode of portable electronic device 120. Processor can also transmit authentication messages to portable electronic device 120, activate a listening mode of dock 100, receive voice recognition mode activation and deactivation messages from portable electronic device 120, receive voice input from microphone 114 and transmit the voice input to portable electronic device 120, receive audio output from portable electronic device 120 and transmit the audio output to speaker 112, and perform other functions. Where dock 100 incorporates a user-operable control (e.g., control buttons 106 and display screen 104 of FIG. 1), processor 202 can interpret user operation of the control and responsively invoke functionality of dock 100.

Dock-specific hardware 208 can include any other components that may be present in dock 100 to enable its functionality. For example, in embodiments of the present invention, dock-specific hardware 208 can include one or more storage devices using fixed or removable storage media, a GPS receiver, a power supply and/or power management circuitry, environmental sensors (e.g., temperature sensor, pressure sensor, accelerometer, chemical sensor, etc.), and/or the like. It is to be understood that any type of dock functionality can be supported by providing appropriate dock-specific hardware 208.

Device I/O interface 204 can allow dock 100 to communicate with portable electronic device 120. In embodiments of the present invention, device I/O interface 204 can include a connector (e.g., connector 116 of FIG. 1) that mates directly with a connector (e.g., receptacle connector 130 of FIG. 1) included in portable electronic device 120. Such a connector can be used to supply power to portable electronic device 120 and/or receive power from portable electronic device 120, to send and/or receive audio and/or video signals in analog and/or digital formats, and to communicate information using one or more data communication interfaces such as USB, UART, and/or FireWire. Other connectors may also be used; for example, device I/O interface 204 can incorporate a standard USB connector and can connect to dock I/O interface 224 of portable electronic device 120 via an adapter cable. In other embodiments of the present invention, device I/O interface 204 can support wireless communication (e.g., WiFi, Bluetooth, or other wireless protocols) in addition to or instead of wired communication channels.

Dock 100 can be any electronic apparatus that interacts with portable electronic device 120. In some embodiments, dock 100 can provide remote control over operations and/or services of portable electronic device 120, or a remote user interface that can include both input and output controls. Dock 100 in various embodiments of the present invention can control any function of portable electronic device 120. For example, dock 100 can transmit a message to portable electronic device 120 to activate a voice recognition mode of portable electronic device 120. In embodiments of the present invention, portable electronic device 120 can also control operations of dock 100, such as transmitting audio output to dock 100 for presentment to a user.

Portable electronic device 120 can provide computing, communication and/or media playback capability. Portable electronic device 120 can include microphone 124, speaker 126, and user interface components 128 of FIG. 1, in addition to a processor 222, a storage device 228, a network interface 230, voice recognition circuitry 232, and a dock input/output (I/O) interface 224. Portable electronic device 120 can also include other components (not explicitly shown) such as a battery, power controllers, and other components operable to provide various enhanced capabilities.

Microphone 124 can include one or more acoustic-to-electric transducers or sensors configured to convert sounds into an electrical signal. For example, microphone 124 can include one or more of a condenser microphone, an electret condenser microphone, a dynamic microphone, a ribbon microphone, a carbon microphone, a piezoelectric microphone, a fiber optic microphone, a laser microphone, a liquid microphone, a MEMS microphone, or the like. In embodiments of the present invention, microphone 124 can transmit voice input received from a user to processor 222 in the form of an electrical signal.

Speaker 126 can include one or more electroacoustic transducers configured to produce sound in response to an electrical audio signal. For example, speaker 126 can include one or more of a full-range driver, a subwoofer, a woofer, a mid-range driver, a tweeter, a coaxial driver, and/or the like. In embodiments of the present invention, processor 222 can transmit audio output to speaker 126 for presentment to a user.

User interface components 128 can include one or more input devices such as a touch pad, touch screen, scroll wheel, click wheel, dial, button, switch, keypad, or the like, as well as output devices such as a video screen, indicator lights, headphone jacks, or the like, together with supporting electronics (e.g., digital-to-analog or analog-to-digital converters, signal processors, or the like). A user can operate user interface components 128 to invoke the various functionalities of portable electronic device 120 and can view and/or hear output from portable electronic device 120 via output devices of user interface components 128.

Processor 222 can include, for example, one or more integrated circuits such as single-core or multi-core microprocessors and/or microcontrollers executing program code to perform various functions and operations associated with portable electronic device 120. In various embodiments, processor 222 can execute a variety of programs in response to program code and can maintain multiple concurrently executing programs or processes. At any given time, some or all of the program code to be executed can be resident in processor 222 and/or in storage media such as storage device 228.

Through suitable programming, processor 222 can provide various functionality for portable electronic device 120. For example, in response to receiving a message from dock 100, processor 222 can activate a voice recognition mode of portable electronic device 120. Processor can also receive voice input from microphone 124 and/or dock 100, generate audio output (e.g., a response to a user request) based on the received voice input, and transmit the audio output to speaker 126 and/or dock 100. Processor 222 can also execute other programs to control other functions of portable electronic device 120, including application programs that may be stored in storage device 228.

Storage device 228 can be implemented using disk, flash memory, or any other non-transitory storage medium, or a combination of media, and can include volatile and/or non-volatile media. In some embodiments, storage device 228 can store data objects such as audio files, video files, image or artwork files, information about a user's contacts (names, addresses, phone numbers, etc.), information about a user's scheduled appointments and events, notes, and/or other types of information. In some embodiments, storage device 228 can also store one or more application programs to be executed by processor 222 (e.g., video game programs, personal information management programs, media playback programs, etc.).

Network interface 230 can provide voice and/or data communication capability for portable electronic device 120. In some embodiments network interface 216 can include radio frequency (RF) transceiver components for accessing wireless voice and/or data networks (e.g., using cellular telephone technology, advanced data network technology such as 3G, EDGE or 4G, WiFi (IEEE 802.11 family standards), or other mobile communication technologies (or any combination thereof), components for short-range wireless networking (e.g., using Bluetooth standards), GPS receiver components, and/or other components. In embodiments of the present invention, network interface 230 can provide wired network connectivity (e.g., Ethernet) in addition to or instead of a wireless interface. Network interface 230 can be implemented using a combination of hardware (e.g., driver circuits, antennas, modulators/demodulators, encoders/decoders, and other analog and/or digital signal processing circuits) and software components.

Voice recognition circuitry 232 can include any suitable hardware and/or software for facilitating a voice recognition mode of portable electronic device 120. A voice recognition mode can include any operational mode of portable electronic device 120 wherein voice input (e.g., a word, phrase, or sound spoken by a user), as distinguished from touch or button input, is used to provide a user access to the various services, applications, and/or functionalities of portable electronic device 120.

Dock I/O interface 224 can allow portable electronic device 120 to communicate with dock 100. In embodiments of the present invention, dock I/O interface 224 can include a connector (e.g., receptacle connector 130 of FIG. 1) that mates directly with a connector (e.g., connector 116 of FIG. 1) included in dock 100. Such a connector may correspond to the connectors used in various iPod®, iPhone®, and iPad® products, as well as the supporting circuitry. The connector can provide connections for power and ground as well as for one or more data communication interfaces such as Universal Serial Bus (USB), FireWire (IEEE 1394 standard), and/or universal asynchronous receiver/transmitter (UART). In embodiments of the present invention, the connector provides dedicated power and ground contacts, as well as some number (e.g., four) of programmable digital data contacts that can be used to implement different communication technologies in parallel. For example, two pins can be assigned as USB data pins (D+ and D−) and two other pins can be assigned as serial transmit/receive pins (e.g., implementing a UART interface). The assignment of pins to particular communication technologies can be negotiated while the connection is being established. In embodiments of the present invention, the connector can also provide connections for audio and/or video signals, which may be transmitted to or from portable electronic device 120 in analog and/or digital formats. Thus, dock I/O interface 224 can support multiple communication channels, and a given dock can use any or all of these channels. In some embodiments of the present invention, dock I/O interface 224 can support wireless communication (e.g., via WiFi, Bluetooth, or other wireless protocols) in addition to or instead of wired communication channels.

It will be appreciated that the system configurations and components described herein are illustrative and that variations and modifications are possible. Portable electronic device 120 and/or dock 100 may have other capabilities not specifically described herein.

Connectors at the respective I/O interfaces 224, 204 of portable electronic device 120 and dock 100 can be complementary or not as desired. Where two connectors are not complementary, an adapter (not shown) can be provided to connect the two devices. While connectors may be described herein as having pins, a term generally associated with conventional electronic devices having wires to connect components, it is to be understood that other signal paths (e.g., optical signaling) can be substituted. Further, in some embodiments, some of the connections can be wireless, and connectors can be omitted where wireless interfaces are provided.

Further, while portable electronic device 120 and dock 100 are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Dock I/O interface 224 of portable electronic device 120 and device I/O interface 204 of dock 100 allow portable electronic device 120 to be connected with dock 100 and subsequently disconnected from dock 100. As used herein, portable electronic device 120 and dock 100 are "connected" whenever a communication channel is established between their respective interfaces and "disconnected" when the channel is terminated. Such connection can be achieved via direct physical connection (e.g., with mating connectors), indirect physical connection (e.g., via a cable), and/or wireless connection (e.g., via Bluetooth or other suitable wireless protocol).

In some embodiments, portable electronic device 120 and dock 100 can communicate while connected by exchanging messages and data according to an "accessory protocol." The messages and data can be communicated, for example, using any wired or wireless transport medium provided by the relevant interfaces.

The accessory protocol can define a "universe" of messages that can be exchanged between portable electronic device 120 and any accessories connected thereto, such as dock 100. The message format can include, e.g., a start bit or bit sequence to indicate that what follows is a message code, followed by an actual message code that can be interpreted and acted on by the recipient. At least some of the message codes may have one or more associated parameters defined by the protocol, and a message can include values for any such parameters in addition to the message code. In some instances, the protocol can further specify a behavior for a recipient in the event that a particular parameter associated with a message code is not received or in the event that an unexpected parameter is received with a message code. The number of parameters can be different for different messages, and in some instances, a parameter may have variable length. In some embodiments, the message codes can be defined such that a given message code is valid in only one direction. Other message structures can also be used.

The accessory protocol can also define a format for the exchange of messages. For instance, the accessory protocol may specify that a message is sent using one or more packets, each of which has a header and a payload. The header provides basic information (e.g., a start indicator; length of the packet; packet sequence number; identifier of a session with which the packet is associated, as described below), while the payload provides all or part of the message data. The packet can also include error-detection or error-correction codes as known in the art.

In some embodiments, the messages can be logically grouped into a "general" message set and an "optional" message set. Every accessory and every portable electronic device that use the accessory protocol can be required to support at least the general message set. This message set can include messages enabling portable electronic device 120 and dock 100 to identify and authenticate themselves to each other and to provide information about their respective capabilities, including which (if any) of the messages in the optional set each supports. For example, the general message set can include a message dock 100 can send to portable electronic device 120 to list every message in the optional set that dock 100 is capable of sending and every message in the optional set that dock 100 is capable of receiving and acting on. The general message set can also include authentication messages that portable electronic device 120 can use to verify the purported identity and capabilities of dock 100 (or vice versa), and dock 100 (or portable electronic device 120) may be blocked from invoking certain (or all) of the optional messages if the authentication is unsuccessful.

The optional message set can include messages related to various functionalities that might or might not be supported in a given accessory. For example, the optional message set can include simple remote messages that allow dock 100 to identify a function of portable electronic device 120 to be invoked (e.g., a voice recognition mode of portable electronic device 120), messages indication activation (or deactivation) or a voice recognition mode of portable electronic device 120, remote user interface messages that can be used to obtain information related to replicating all or part of a user interface of portable electronic device 120 on dock 100 (thereby supporting a more advanced remote control), messages that allow a user to control a radio tuner in dock 100 by operating portable electronic device 120 and/or to control a radio tuner in portable electronic device 120 by operating dock 100, messages that facilitate the transfer of voice input and audio output between portable electronic device 120 and dock 100, and so on. Any combination of optional messages can be defined in an accessory protocol, and there is no requirement that a given accessory or portable electronic device support all (or even any) of the optional messages.

Figure 3:
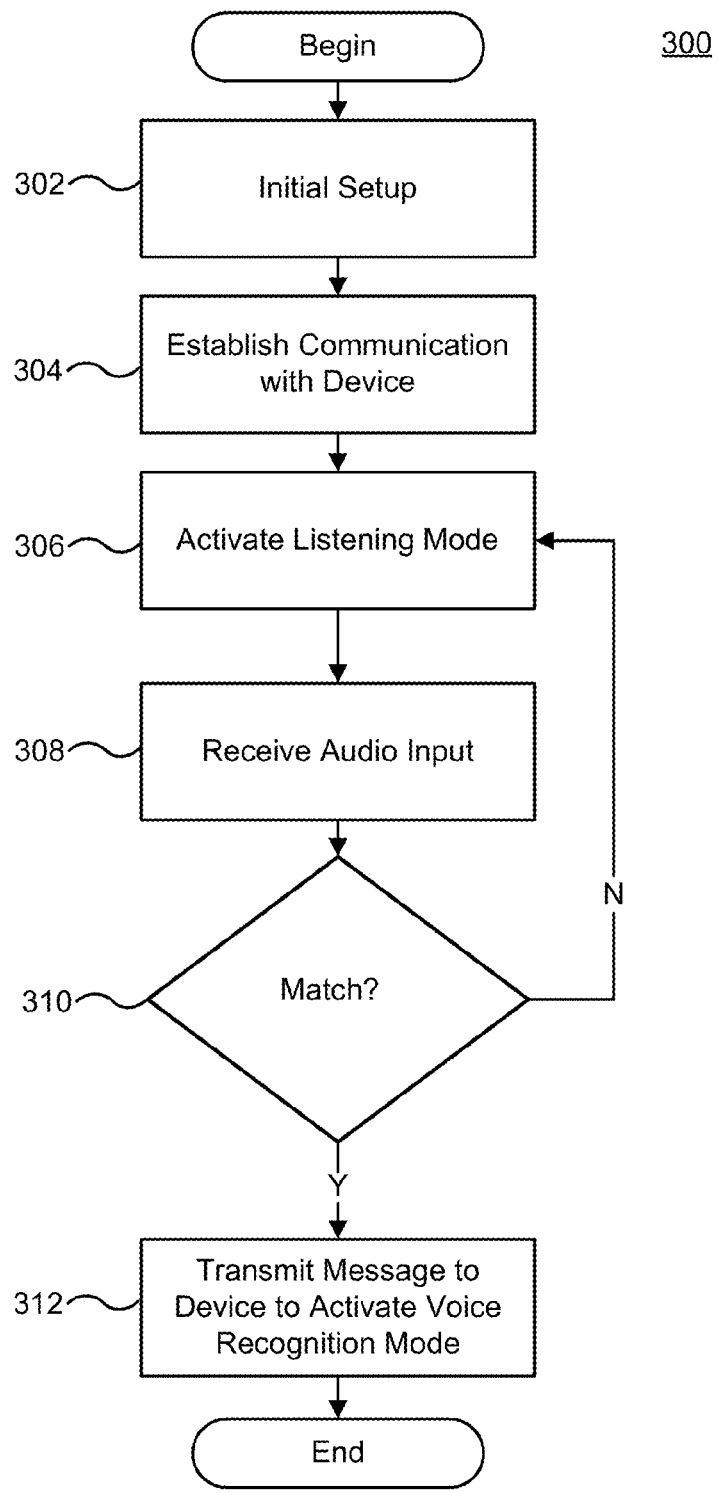
FIG. 3 illustrates a flow diagram of a process 300 usable by dock 100 to activate a voice recognition mode of portable electronic device 120 according to an embodiment of the present invention.

FIG. 3 illustrates a flow diagram of a process 300 usable by dock 100 to activate a voice recognition mode of portable electronic device 120 according to an embodiment of the present invention.

At block 302, dock 100 can perform an initial setup process with a user, according to an embodiment of the present invention, wherein a user is prompted by dock 100 to provide audio input in the form of a spoken word or phrase (or a sound such as a hand clap, finger-snap, etc.) into microphone 114. In response, microphone 114 can transmit the received audio input to processor 202 of dock 100 as an electrical signal. Processor 202 can digitize the electrical signal using an analog-to-digital converter and store the digitized signal as an audio file in an internal storage device. Dock 100 may also prompt the user to repeat the spoken word, phrase, or sound multiple times so that the stored audio file can reflect a statistical average computed by processor 202 of dock 100. In embodiments of the present invention, dock 100 may be configured to analyze accents, varying speed of delivery, pitch, volume, inflection, and other aspects of the received audio input during the initial setup process.

At block 304, dock 100 can establish communication with portable electronic device 120. For example, upon detecting that portable electronic device is connected, dock 100 can communicate with portable electronic device 120 to perform a number of authentication steps by exchanging messages across connector 116 and receptacle connector 130 shown in FIG. 1. Dock 100 and portable electronic device 120 can also exchange messages wirelessly. In an embodiment of the present invention, dock 100 can transmit a message to portable electronic device 120 to identify and authenticate dock 100, and portable electronic device 120 can transmit a message to dock 100 to identify and authenticate portable electronic device 120.

Messages exchanged at block 304 can also relate to the respective capabilities of dock 100 and portable electronic device 120. For example, portable electronic device 120 can transmit a message to dock 100 indicating that portable electronic device 120 is configured to accept and act on a received message instructing portable electronic device 120 to activate a voice recognition mode. Similarly, dock 100 can transmit a message to portable electronic device 120 indicating that dock 100 is configured to generate and transmit a message instructing portable electronic device 120 to activate the voice recognition mode. In embodiments of the present invention, dock 100 and portable electronic device 120 can exchange messages relating to their respective capabilities for handling messages related to activation and deactivation of the voice recognition mode of portable electronic device 120, and the exchange of voice input and audio output. Upon completion of the exchange of messages relating to capabilities and authentication between portable electronic device 120 and dock 100, portable electronic device 120 can activate a low power "sleep" mode wherein one or more functionalities of portable electronic device 120 are deactivated to conserve battery power. For example, portable electronic device 120 may deactivate a display screen or other user interface component.

At block 306, after communication between dock 100 and portable electronic device 120 is established, dock 100 can activate a "listening mode." When in the listening mode, dock 100 can utilize microphone 114 to continuously "listen" for audio input from the user and other sources. Microphone 114 may be configured to detect audio input with a volume level above a specific threshold and may also be sensitive to audio input originating from a distance within a specific threshold (e.g., 20 feet) from microphone 114. For example, during the initial setup process, dock 100 may prompt the user to select a volume and distance threshold to ensure that sounds originating from another room, for example, are not detected by microphone 114 when dock 100 is in the listening mode.

At block 308, microphone 114 of dock 100 can detect audio input from the user or other source. Microphone 114 can transmit the audio input as an electrical signal to processor 202. Further, upon receipt of the audio input, processor 202 can deactivate the listening mode of dock 100, and the process 300 can proceed to decision 310.

At decision 310, processor 202 of dock 100 can determine whether the received audio input "matches" the stored audio file created during the initial setup procedure of block 302. To determine a match, processor 202 can compare one or more data points of the received audio input to the stored audio file.

If at decision 310, processor 202 determines that the received audio input does not match the stored audio file, the process 300 can return to block 306 wherein the listening mode of dock 100 is reactivated. For example, if the received audio input corresponds to a different word or phrase spoken by the user than that of the stored audio file, processor 202 can reactivate the listening mode of dock 100 so that microphone 114 can listen for further audio input. Similarly, if the received audio input corresponds to a source other than the user (e.g., another person, sound from a television, music playing nearby, etc.), the listening mode of dock 100 can be reactivated.

If at decision 310, processor 202 determines that the received audio input matches the stored audio file, the process 300 can proceed to block 312. For example, if processor 202 determines that one or more data points of the received audio input are the same (or substantially the same) as corresponding data points of the stored audio file, the process 300 can proceed to block 312.

At block 312, processor 202 of dock 100 can transmit a message to portable electronic device 120 to activate a voice recognition mode of portable electronic device 120 via connector 116 shown in FIG. 1. In response to the received message, portable electronic device 120 can activate the voice recognition mode. In embodiments of the present invention, portable electronic device 120 can deactivate its low power "sleep" mode at the same time or prior to activating its voice recognition mode.

Portable electronic device 120 can provide an indication to the user of activation of the voice recognition mode. For example, processor 222 of portable electronic device 120 can transmit audio output to speaker 126, visual output to a display screen, or utilize one or more of the user interface components 128 to provide an indication to the user that the voice recognition mode of portable electronic device 120 is activated.

The voice recognition mode can include any operational mode of portable electronic device 120 wherein voice input (e.g., a word, phrase, or sound provided by the user), as distinguished from touch or button input, is used to access various services, applications, and/or functionalities of portable electronic device 120. Such voice input can be received by portable electronic device 120 even when the user is not in close proximity (e.g., when the user is located several feet away from portable electronic device 120). In embodiments of the present invention, the voice recognition mode of portable electronic device 120 can include an intelligent automated assistant as described by U.S. patent application Ser. No. 12/987,982, entitled "Intelligent Automated Assistant" which is herein incorporated by reference in its entirety.

When the voice recognition mode of portable electronic device 120 is activated, processor 222 can interact with voice recognition circuitry 232, microphone 124, speaker 126, storage device 228, and/or network interface 230 of portable electronic device 120 to process voice input received from the user. For example, the user can provide voice input to microphone 124 including a user request. The user request may be a request to utilize one or more services, applications, and/or functionalities of portable electronic device 120 such as placing a phone call, playing multimedia content (e.g., playing a song from the user's music library), sending a message (e.g., a voice message, e-mail message, SMS message, video message, instant message, meeting invite, etc.), creating a calendar entry (e.g., creating a meeting, task, reminder, etc.), retrieving driving and/or walking directions, retrieving public transportation information, setting an alarm, checking the weather forecast, locating attractions, creating restaurant reservations, accessing reviews, searching the Internet, and/or the like. The user request may also relate to system notifications of portable electronic device 120 such as missed calls and unread voice messages, e-mail messages, SMS text messages, instant messages, and/or the like.

Upon receipt, microphone 124 can transmit the voice input including the user request as an electrical signal to processor 222 which can process the user request. Processing of the voice input can be accomplished in a number of different ways according to embodiments of the present invention. As an initial step, processor 222 can utilize voice recognition circuitry 232 to convert the received voice input into instructions usable by processor 222 for generating a response to the user request. If user request relates all or in part to data stored internally, processor 222 can retrieve such internal data from storage device 228, for example. If the user request relates all or in part to data stored externally (e.g., on an Internet website), processor 222 can retrieve such external data using network interface 230. Processor 222 can then generate audio output including a response to the user request, the response including at least a portion of the retrieved data. The generated audio output including the response to the user request can be transmitted by processor 222 to speaker 126 for presentment to the user.

The voice recognition mode of portable electronic device 120 can be deactivated automatically by processor 222 upon transmission of the audio output to speaker 126. Processor 222 can also deactivate the voice recognition mode in response to receipt of a predetermined voice input from the user, input received from the user via or more of user interface components 128, and/or the expiration of a predetermined period of time during which the voice recognition mode of portable electronic device 120 is activated but no voice input (or other input) from the user is received. Upon deactivation of the voice recognition mode, processor 222 of portable electronic device 120 can transmit a message to dock 100 indicating deactivation of the voice recognition mode.

As explained above, at block 308 of process 300, processor 202 of dock 100 can deactivate the listening mode of dock 100 upon receipt of the audio input from the user or other source. In embodiments of the present invention, processor 202 can alternatively deactivate the listening mode of dock 100 upon transmission of the message to portable electronic device 120 to activate the voice recognition mode of portable electronic device 120. In either case, listening mode of dock 100 can remain deactivated until dock 100 receives the message from portable electronic device 120 indicating deactivation of the voice recognition mode. In response to the deactivation message, processor 202 of dock 100 can reactivate the listening mode of dock 100 (i.e. return to block 306 of process 300) to listen for further audio input from the user or other source. In an embodiment of the present invention, listening mode of dock 100 can alternatively remain deactivated until the expiration of a predetermined period of time, upon which processor 202 can reactivate the listening mode of dock 100 whether or not a deactivation message is received from portable electronic device 120.

By deactivating the listening mode of dock 100 while the voice recognition mode of portable electronic device 120 is activated (and/or for a predetermined period of time), a scenario can be prevented wherein voice input intended by the user to be received and processed by portable electronic device 120 is instead received by dock 100, causing processor 202 of dock 100 to transmit another message to portable electronic device 120 to reactivate and/or reset the voice recognition mode of portable electronic device 120. This scenario could occur, for example, if the voice recognition mode of portable electronic device 120 and the listening mode of dock 100 are activated at the same time, and if all or part of the voice input provided by the user for receipt and processing by portable electronic device 120 is the same (or substantially the same) as the audio input included in the stored audio file as provided by the user to dock 100 during the initial setup process (i.e. at block 302 of process 300). However, by deactivating the listening mode of dock 100 while the voice recognition mode of portable electronic device 120 is activated (and/or for a predetermined period of time), this scenario can be prevented.

In an embodiment of the present invention, when the voice recognition mode is activated, portable electronic device 120 can utilize microphone 114 of dock 100 to receive voice input from the user instead of, or in addition to, microphone 124 of portable electronic device 120. Similarly, portable electronic device 120 can utilize speaker 112 of dock 100 to present audio output to the user instead of, or in addition to, speaker 126 of portable electronic device 120.

Figure 4:
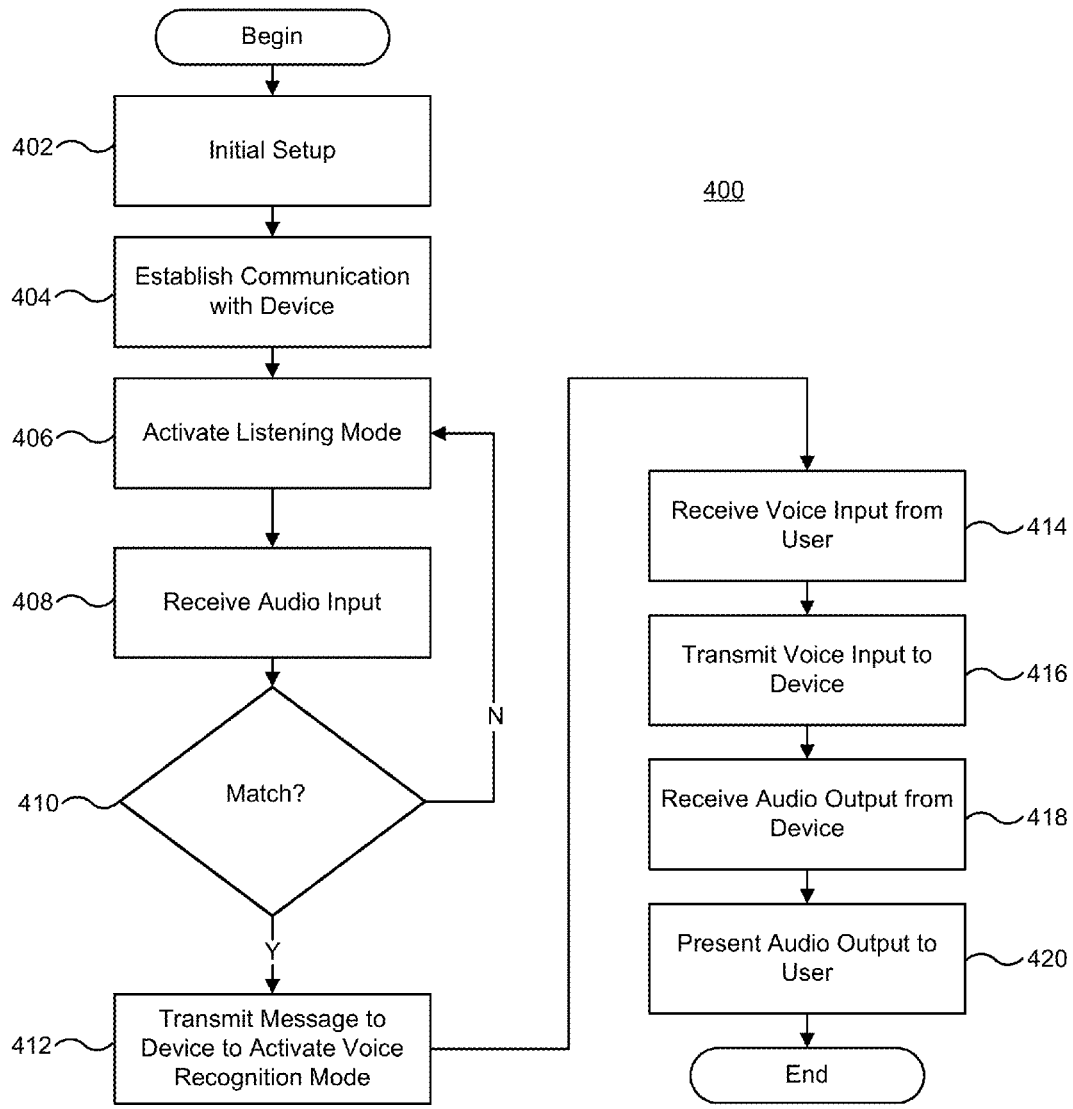
FIG. 4 illustrates a flow diagram of a process 400 usable by dock 100 to receive voice input from a user and to provide audio output generated by portable electronic device 120 to the user according to an embodiment of the present invention.

FIG. 4 illustrates a flow diagram of a process 400 usable by dock 100 to receive voice input from a user and to provide audio output generated by portable electronic device 120 to the user according to an embodiment of the present invention. Blocks 402-412 of process 400 correspond to blocks 302-312 of process 300, illustrated in FIG. 3, and are described in detail above.

At block 412 (corresponding to block 312 of process 300) processor 202 of dock 100 can transmit the message to portable electronic device 120 to activate the voice recognition mode of portable electronic device 120, and in response to the received message, portable electronic device 120 can activate the voice recognition mode.

Portable electronic device 120 can provide an indication to the user of the activation of the voice recognition mode using the functionalities of dock 10. For example, processor 222 of portable electronic device 120 can transmit audio output to processor 202 of dock 10, the audio output indicating activation of the voice recognition mode. Processor 202 of dock 10 can transmit the audio output to speaker 112 of dock 100 for presentment to the user. Processor 222 of portable electronic device 120 can also transmit a message to processor 202 of dock 100 to utilize one or more of the user interface components 206 of dock 100 to provide an indication to the user that the voice recognition mode of portable electronic device 120 is activated.

At block 414, microphone 114 of dock 100 can receive voice input from the user. As explained above, the voice input can include a user request to utilize one or more services, applications, and/or functionalities of portable electronic device 120. Microphone 114 can transmit the received voice input including the user request as an electrical signal to processor 202 of dock 100.

At block 416, processor 202 of dock 100 can transmit the voice input including the user request to processor 222 of portable electronic device 120. As explained above, processor 222 can process the user request, retrieve internal and/or external data related to the request, and generate audio output including a response to the user request. Processor 222 of portable electronic device 120 can transmit the audio output to processor 202 of dock 100.

At block 418, processor 202 of dock 100 can receive the audio output including the response to the user request from processor 222 of portable electronic device 120.

At block 420, processor 202 of dock 100 can transmit the received audio output including the response to the user request to speaker 112 for presentment to the user.

As explained above, upon deactivation of the voice recognition mode of portable electronic device 120, dock 100 can receive a message from processor 222 of portable electronic device 120 indicating deactivation of the voice recognition mode. In response to the deactivation message (and/or the expiration of a predetermined period of time), processor 202 of dock 100 can reactivate the listening mode of dock 100 (i.e. return to block 406 of process 400) to listen for further audio input from the user or other source.

As will be understood by those skilled in the art, the present invention may be embodied in other specific forms without departing from the essential characteristics thereof. Various configurations described herein may be combined without departing from the present invention. The above described embodiments of the present invention are presented for purposes of illustration and not of limitation. The present invention also can take many forms other than those explicitly described herein. Those skilled in the art will recognize, or be able to ascertain, using no more than routine experimentation, many equivalents to the specific embodiments of the invention described herein. Accordingly, it is emphasized that the invention is not limited to the explicitly disclosed methods, systems and apparatuses, but is intended to include variations to and modifications thereof which are intended to be encompassed by the following claims.

What is claimed is:

1. A method for processing input at dock for a portable electronic device, the method comprising:
  activating a continuous listening mode on the dock;
  detecting audio input at a microphone integrated within a housing of the dock;
  comparing the audio input to a stored audio file, wherein comparing is done at the dock, wherein the continuous listening mode on the dock is deactivated while the audio input is being compared to the stored audio file, and wherein comparing includes determining whether the audio input matches the stored audio file;
  reactivating the continuous listening, mode at the dock when it is determined that the audio input does not match the stored audio file;
  transmitting a message requesting activation of a voice recognition mode on the portable electronic device when it is determined that the audio input matches the stored audio file, wherein the message is transmitted using a communication interface of the dock, and wherein when the message is received at the portable electronic device, the voice recognition mode on the portable electronic device is activated; and
  deactivating the continuous listening mode of the dock when the voice recognition mode on the portable electronic device is activated.

2. The method of claim 1, further comprising detecting additional audio input at the microphone integrated within the housing of the dock.

3. The method of claim 2, further comprising transmitting the additional audio input using the communication interface of the dock.

4. The method of claim 1, further comprising providing an indication that the voice recognition mode on the portable electronic device has been activated.

5. The method of claim 1, further comprising performing an initial setup process before activating the continuous listening mode on the dock.

6. The method of claim 1, further comprising, transmitting, by the dock, an authentication message to the portable electronic device via the communication interface of the dock.

7. The method of claim 1, wherein the dock receives a message from the portable electronic device via the communication interface, the message indicating deactivation of the voice recognition mode of the portable electronic device.

8. A dock, comprising:
  one or more processors;
  a memory coupled to the one or more processors and containing instructions that, when executed by the one or more processors cause the one or more processors to perform operations including:
    activating a continuous listening mode on the dock for a portable electronic device;
    detecting audio input at a microphone integrated within a housing of the dock;
    comparing the audio input to a stored audio file, wherein comparing is done at the dock, wherein the continuous listening mode on the dock is deactivated while the audio input is being compared to the stored audio file, and wherein comparing includes determining whether the audio input matches the stored audio file;
reactivating the continuous listening mode at the dock when it is determined that the audio input does not match the stored audio file;
transmitting a message requesting activation of a voice recognition mode on the portable electronic device when it is determined that the audio input matches the stored audio file, wherein the message is transmitted using a communication interface of the dock, and wherein when the message is received at the portable electronic device, the voice recognition mode on the portable electronic device is activated; and
deactivating the continuous listening mode of the dock when the voice recognition mode on the portable electronic device is activated.

9. The dock of claim 8, wherein the operations further include detecting additional audio input at the microphone integrated within the housing of the dock.

10. The dock of claim 9, wherein the operations further include transmitting the additional audio input using the communication interface of the dock.

11. The dock of claim 8, wherein the operations further include providing an indication that the voice recognition mode on the portable electronic device has been activated.

12. The dock of claim 8, wherein the operations further include performing an initial setup process before activating the continuous listening mode on the dock.

13. The dock of claim 8, wherein the operations further include, transmitting, by the dock, an authentication message to the portable electronic device via the communication interface of the dock.

14. The dock of claim 8, wherein the operations further include the dock receiving a message from the portable electronic device via the communication interface, the message indicating deactivation of the voice recognition mode of the portable electronic device.

15. A system comprising:
a portable electronic device including:
a portable electronic device processor; and
a portable electronic device electrical connector coupled to the portable electronic device processor;
a dock including:
a dock connector configured to mate with the portable electronic device connector;
one or more dock processors coupled to the dock connector; and
a dock memory containing instructions that, when executed by the one or more dock processors cause the one or more dock processors to perform operations including:
activating a continuous listening mode on the dock;
detecting audio input at a microphone integrated within a housing of the dock;
comparing the audio input to a stored audio file, wherein comparing is done at the dock, wherein the continuous listening mode on the dock is deactivated while the audio input is being compared to the stored audio file, and wherein comparing includes determining whether the audio input matches the stored audio file;
reactivating the continuous listening mode at the dock when it is determined that the audio input does not match the stored audio file;
transmitting a message requesting activation of a voice recognition mode on the portable electronic device when it is determined that the audio input matches the stored audio file, wherein the message is transmitted using a communication interface of the dock, and wherein when the message is received at the portable electronic device, the voice recognition mode on the portable electronic device is activated; and
deactivating the continuous listening mode of the dock when the voice recognition mode on the portable electronic device is activated.

16. The system of claim 15, wherein the operations further include detecting additional audio input at the microphone integrated within the housing of the dock.

17. The system of claim 16, wherein the operations further include transmitting the additional audio input using the communication interface of the dock.

18. The system of claim 15, wherein the operations further include providing an indication that the voice recognition mode on the portable electronic device has been activated.

19. The system of claim 15, wherein the operations further include performing an initial setup process before activating the continuous listening mode on the dock.

20. The system of claim 15, wherein the operations further include the dock receiving a message from the portable electronic device via the communication interface, the message indicating deactivation of the voice recognition mode of the portable electronic device.

* * * * *